March 21, 1967 R. C. EDWARDS 3,310,646
THERMAL SWITCH DEVICE WITH ADJUSTING BOLT MEANS FOR
THE ARMS OF THE U-SHAPED HINGE ASSEMBLY
Filed Nov. 13, 1964 3 Sheets-Sheet 1

RAY C. EDWARDS
INVENTOR.

BY

March 21, 1967 R. C. EDWARDS 3,310,646
THERMAL SWITCH DEVICE WITH ADJUSTING BOLT MEANS FOR
THE ARMS OF THE U-SHAPED HINGE ASSEMBLY
Filed Nov. 13, 1964 3 Sheets-Sheet 2

RAY C. EDWARDS
INVENTOR.

BY

RAY C. EDWARDS
INVENTOR.

United States Patent Office 3,310,646
Patented Mar. 21, 1967

3,310,646
THERMAL SWITCH DEVICE WITH ADJUSTING
BOLT MEANS FOR THE ARMS OF THE
U-SHAPED HINGE ASSEMBLY
Ray C. Edwards, 396 Ski Trail,
Smoke Rise, N.J. 07405
Filed Nov. 13, 1964, Ser. No. 410,997
4 Claims. (Cl. 200—138)

This invention relates to thermostats and particularly to a thermostat adapted to control operation of a heating and cooling system for enclosures.

An object of the present invention is to provide a dual range thermostat which combines control of heating and cooling in one instrument. At one setting of the temperature selector dial the thermostat will initiate operation of either the heating system or the cooling system to bring an enclosure to the desired temperature without requiring any switchover or manual adjustment of the thermostat or of the heating or cooling systems.

The thermostat of the present invention is particularly adaptable for use in heating and cooling systems as disclosed in my copending applications for:

(a) Heating and Cooling System and Apparatus for Enclosures, filed Nov. 14, 1963, Ser. No. 323,622.

(b) Air Controlled Unit and Zone Controlled Air Conditioning Sytem, filed Jan. 6, 1964, Ser. No. 335,864, and (c) Air Handling Unit, filed Nov. 13, 1963, Ser. No. 323,623.

It may however be employed in other heating and cooling systems where it is desired to maintan a constant enclosure temperature without adjustment or seasonal change-over of the apparatus employed.

Moreover when the present thermostat is employed in heating and cooling systems as above referred to or in similar or analogous systems which are employed to control the termperature in a plurality of rooms in an enclosure, thermostats may be employed in each room and set to control the temperature in each room independently of any other room and without affecting the operation of the overall heating and cooling apparatus.

The thermostat of the present invention also embodies in its construction a heat anticipator which comes into operation upon the initiating of operation of the heating apparatus in the system, to cut off the flow of the heating medium to the enclosure before the temperature in the enclosure reaches the temperature setting of the temperature selector dial of the thermostat but after the heating medium has been distributed throughout the heating system. Should the room temperature at this time fail to reach the dial setting by continued radiation of heat from the heating system, the heat anticipator then being inactive, will allow re-operation of the heating system until the thermostat is satisfied that the temperature in the room coincides with the dial setting.

Figure 1:
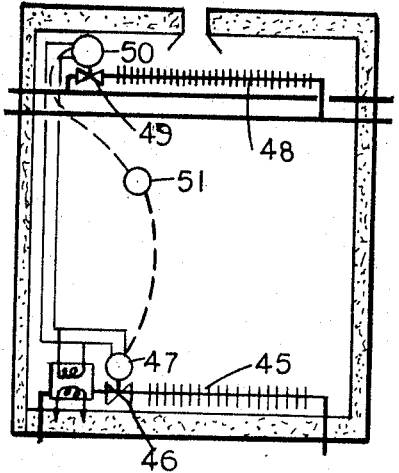
FIGURE 1 is a diagrammatic view showing one application of the thremostat.
Figure 2:
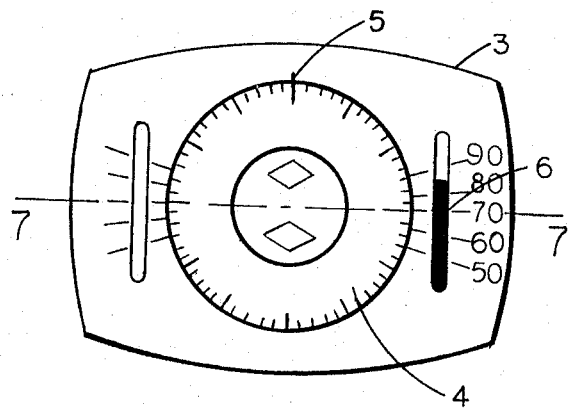
FIGURE 2 is a front view of the thermostat.
Figure 3:
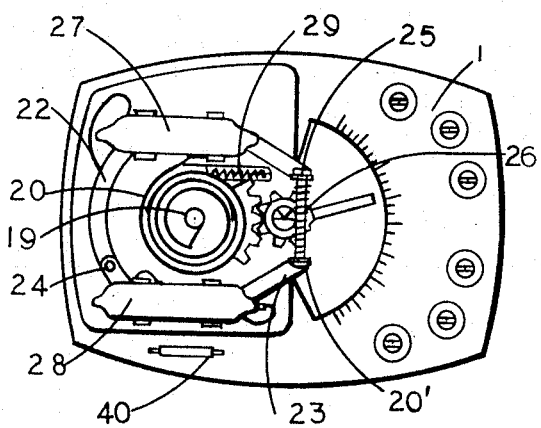
FIGURE 3 is a plan view of the thermostat with the cover plate removed.
Figure 4:
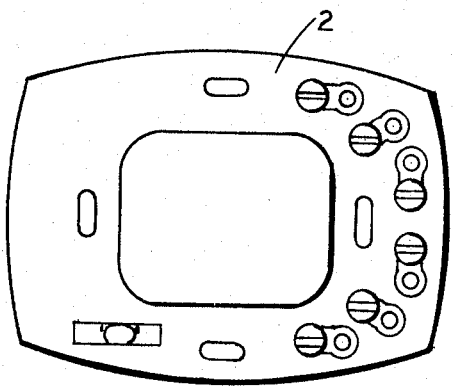
FIGURE 4 is a plan view of the sub-base of the thermostat.
Figure 5:
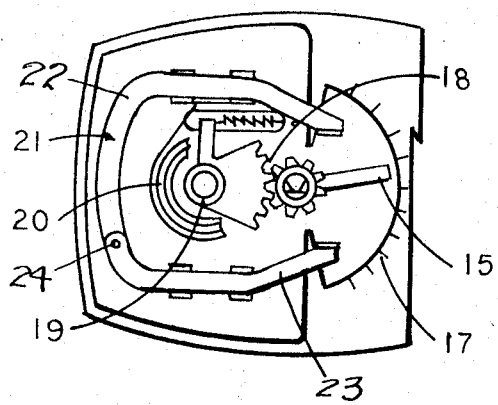
FIGURE 5 is a plan view of the thermostat main body with parts broken away.
Figure 6:
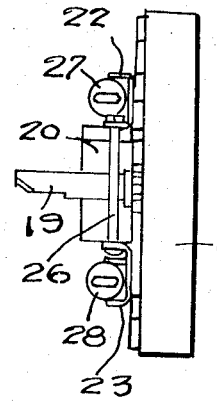
FIGURE 6 is an end view of the thermostat with the cover removed.

Referring more particularly to the drawings, the thermostat comprises in general three elements, i.e. body 1, sub-base or wall plate 2 and cover 3, which when assembled, form a neat appearing compact unit.

The body 1 carries the heating and cooling switches, bimetal coil, temperature selector, temperautre selector dial, heat anticipator and their co-operating elements all as will be specifically described hereinafter. The sub-base 2 carries electrical connectors etc., while the cover 3 carries the manually operated selector dial 4 which co-operates with the indicia line or point 5 to indicate or show the temperature setting at which the thermostat is set to control the temperature in the enclosure. As shown the dial 4 is calibrated to indicate various degrees of temperature. A thermometer 6 is carried by the cover 3 to show the temperature in the enclosure and is entirely independent of any temperature setting or temperature controlling elements of the thermostat.

Figure 7:
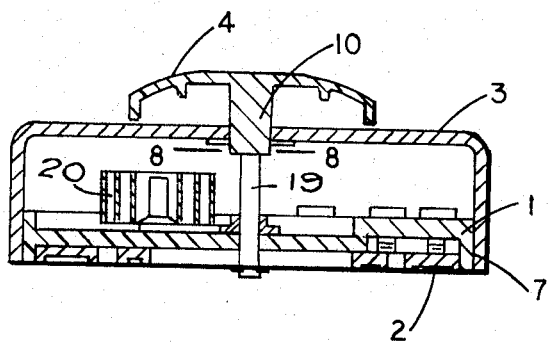
FIGURE 7 is a detail section taken on line 7—7 of FIGURE 2.
Figure 7A:
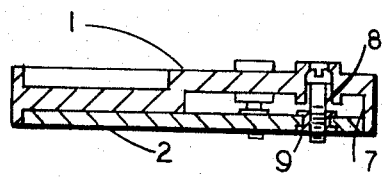
FIGURE 7a is an enlarged section through a part of the body and sub-base.
Figure 8:
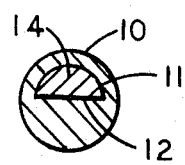
FIGURE 8 is an enlarged view taken on line 8—8 of FIGURE 7.

The body 1, subbase 2 and cover 3 are all made of a suitable material such as plastic "cycolac" which is electrical current insulating and embodies a degree of elasticity. The body 1 has an annular flange 7 formed thereon which snugly fits the outer edges of the sub-base or wall plate 2 (as shown in FIG. 7 of the drawings). The body or switch plate 1 is connected to the sub-base or wall plate 2 by means of filister head screws 8 which thread into retaining connectors and Stimpson rivets 9 carried by the subbase 2. The filister head screws and retaining connector and Stimpson rivets 9 serve the dual purpose of electrically and mechanically connecting the body 1 and subbase or wall plate 2, in that they serve as connectors for various electrical wires employed in the thermostat.

The manually operated selector dial 4 has a stem 10 formed thereon and extending through the cover 3. This stem has a semi-cylindrical bore 11 which slidably fits over the flattened end 12 of the selector shaft 14, to rotate the shaft upon setting movement of the dial 4. A roll pin 15 extends radially from the shaft, serves to connect pinion 16 to the shaft and also acts as a pointer in connection with the temperature degree calibration 17 on the body plate 1. The roll pin or pointer 15 and calibration 17 are set or arranged to coincide exactly with the setting of the temperature calibrations or dial 4 and point 5 on cover body.

The pinion 16 meshes with a segmental gear 18 mounted on a shaft 19, to rotate shaft 19 upon setting movement of the dial 4.

A bimetal coil 20 has one end (i.e. its inner end) attached to shaft 19 (such as by spot welding) and its other end attached to a hinge assembly 21. The bimetal coil is of any approved make which can be purchased on the open market and is subject to expansion or contraction upon temperature variances.

The hinge assembly 20' which is substantially horse shoe or U shaped in plan view is composed of two sections or arms 22 and 23 which are pivotally connected to each other at 24 and have their free ends connected by an adjusting screw 25 and spring 26 assembly to provide for accurate adjustment of the hinge assembly elements or sections 22 and 23 to accurately position the mercury switches 27 and 28.

A spring 29 has one end connected to body plate 1 and the other end to the calibration shaft 14 for the purpose of maintaining pressure on the teeth of the pinion 16 and segment gear 18 for accuracy of operation thereof.

The section 22 of the hinge assembly has a heating control mercury switch 27 attached thereto while the section 23 has a cooling control mercury switch 28 attached thereto.

The mercury switches 27 and 28 are identical in construction and each include a sealed bulb 29 having an electrical connector 30 extending thereinto near one end of the bulb and a second electrical connector 31 extending thereinto near the other end of the bulb 29.

Figure 9:
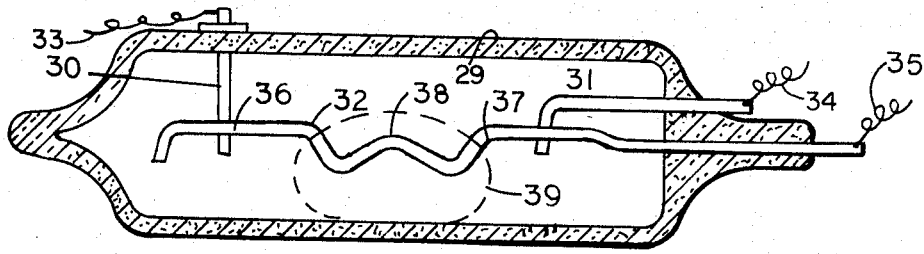
FIGURE 9 is an enlarged section through one of the mercury switches employed in the thermostat.

The thermostat operates on a three wire principle so a common electrical connector 32 extends longitudinally in the tube 29. Electrical wires indicated at 33, 34 and 35 are connected to the respective electrical connectors 30, 31 and 32, as shown in FIG. 9.

The electrical connector 32 is sinuous in shape having raised portions 36 and 37 in the vicinity of the electrical connectors 30 and 31, and an intermediate depressed portion 38. A globule of mercury shown at 39 moves freely in the sealed tube 29, and depending upon the tilted position of the tube makes contact between either the electrical connectors 30 and 32 or between the electrical connectors 31 and 32, or in the position shown in FIG. 9 of the drawings contacts only the electrical connector 32 at which electrical current flow through the switch is cut off.

A heat anticipator 40 is carried by the body 1 and enclosed in the cover 3 as well as connected in the electrical circuit of the thermostat. This heat anticipator 40 is an electrical current flow resistor of suitable ohms and wattage (as an example a 3000 ohm, one quarter watt resistor) for generating heat within the thermostat structure, to effect a cutting off of the thermostat shortly before the enclosure temperature reaches the setting of the dial 4, but after the heating medium has been circulated in the enclosure or room, thus cutting off further flow of heating medium (not shown) to the room or enclosure and resulting in a saving of fuel used in heating the heating medium and providing a more accurate control of the heating of the room or enclosure. In the event the room or enclosure does not reach the temperature of the temperature setting of the dial 4, after the heat anticipator 40 has cut off the flow of heating medium, the heat anticipator 40 will cool almost instantly and the bimetal coil 20 will act to operate the mercury switch carrying assembly 22 and 23 to again effect the flow of heating medium to the room or enclosure, this cycle will continue until the temperature in the room or enclosure is at that indicated by the setting of the dial 4 at which time the thermostat will be satisfied and will remain inactive until there is another temperature change in the room or enclosure.

FIGURE 1 of the drawings shows one use application of the thermostat of the present invention, i.e. its use in a system and apparatus for maintaining a desired temperature in a room. The system and apparatus shown in FIGURE 1 is of the base-board heating valance cooling convection type as disclosed in my prior applications hereinabove referred to.

The room or enclosure is heated by a baseboard heating unit 45 through which a heating medium (such as hot water) is circulated by suitable circulating means (not shown) from a source of heat (not shown) under control of a valve 46 operated by an electric motor 47 while the room is cooled by a valance cooling unit 48 through which a cooling medium is circulated from a source of cooling (not shown) under control of a valve 49 operated by a motor 50. (This heating and cooling system and apparatus is fully disclosed in my co-pending applications above referred to.) The thermostat generically indicated by 51 is connected to the motors 47 and 50 of the valves 46 and 49 to control operation of these valves in accordance with variations of the temperature in the room and its relation to the setting of the dial 4 of the thermostat.

Figure 10:
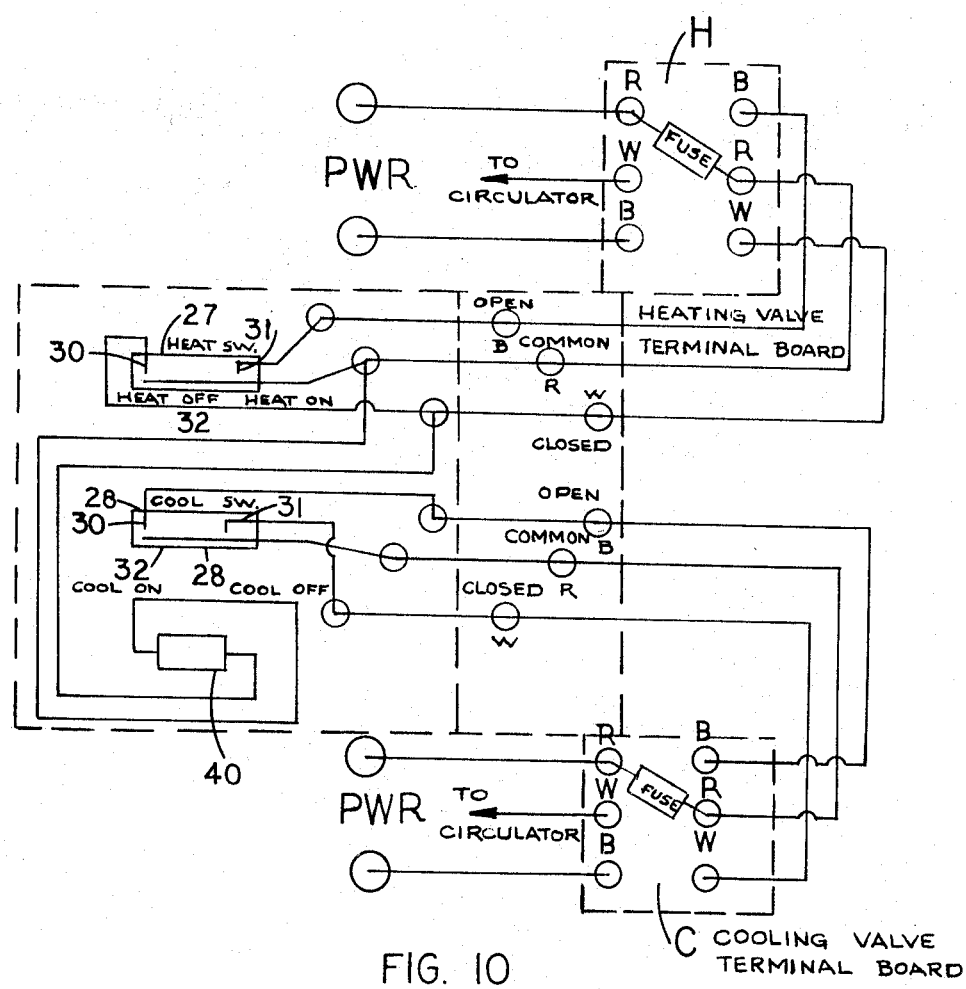
FIGURE 10 is a diagram of the electrical circuit employed in the thermostat.

FIGURE 10 of the drawings shows a layout of the electrical circuit of the thermostat in which the heating valve operating terminal board is indicated by H, while the cooling valve operating board is indicated by C.

A typical example would be; the dial 4 set at 70 degrees, room temperature at 70 degrees, at which time both mercury switches 27 and 28 would be in off position and both valves 46 and 49 would be closed.

Room temperature rises five (5) degrees; the bimetal coil 20 expands moving the hinge assembly 20' consisting of the pivotally connected sections 22 and 23 counter clockwise causing mercury swich 28 to move to "on" position; i.e. make an electrical connection between contacts 30 and 32. This causes operation of motor 50 to open valve 49, allowing cooling unit (not shown) to operate and cause the cooling medium to flow through the system.

When room is cooled to the temperature indicated by the setting of the thermostat dial 4, the bimetal coil 20 contracts and causes switch 28 to move to "off" position, effecting closing of the valve 49.

Room temperature lowers to 65 degrees. The bimetal coil 20 contracts and causes hinge assembly 20' to move clockwise moving mercury switch 27 to the "on" position, i.e. causing the mercury globule to close an electric circuit through contacts 30 and 32. This in turn effects operation of motor operated valve 46 and also applies current to the heat anticipator 40. The resistor of the heat anticipator having current flow and a special value of resistance will give off a certain amount of heat; this allows the bimetal coil 20 to act before the room reaches the desired temperature (as per the setting of dial 4) causing the valve 46 to close when the coil 20 expands and moves the switch 28 to the "Off" position.

At this time the heat has been distributed throughout the heating system and the temperature in the room is slowly rising. When switch 27 went into "Off" position, current flow through the heat anticipator was stopped. Should the temperature in the room not continue to rise to reach the degree indicated by the setting of the dial 4, the bimetal coil 20 will contract to room temperature which is below the setting of dial 4 and the switch 27 will again move to the "On" position to effect opening of the valve 46 and allow heating medium to flow through the heating system. This cycle will continue until the temperature in the room reaches that indicated by the setting of the dial 4. At this time the thermostat is satisfied and will not operate either switch or valve 46 or 49 unless there is a change in the room temperature. Thus a savings is effected in fuel required to heat the heating medium and an acurate heating of the room or enclosure is effected.

The adjusting screw 25 of the hinge assembly 20' together with its nut 25' provides for adjustment of the pivotally connected hinge assembly sections 22 and 23 relative to each other for changing the differential between the heating and cooling ranges.

What is claimed is:

1. In a dual thermostat, a substantially U-shaped hinge assembly comprising a pair of pivotally connected arms, a heating control electrical circuit opening and closing switch carried by one of said arms and operated by movement of the arm, a cooling control electrical circuit opening and closing switch carried by the other arm of said U-shaped hinge assembly and operated by movement of the arm, means operated by variations in the ambient temperature to move said hinge assembly to move said switches into and out of electrical circuit opening or closing positions, an adjusting screw and nut assembly interconnecting the two arms of said U-shaped hinge assembly and operating independently of the pivoted connection of the arms for changing the differential between the heating and cooling range of operation of the switches.

2. A thermostat as claimed in claim 1, wherein said ambient temperature operated means includes a shaft, a bi-metal coil having one end connected to said shaft and its other end connected to one arm of said U-shaped hinge assembly, a gear connected to said shaft for rotating it, a pinion for rotating said gear, a shaft carrying pinion and a manually operated selector dial on said pinion carrying shaft.

3. In a dual range thermostat, a substantially U-shaped hinge assembly comprising a pair of pivotally connected arms, an electrical circuit opening and closing switch carried by one of said arms, a second electrical circuit opening and closing switch carried by the other arm, a shaft, a bi-metal coil subject to expansion or contraction upon variances in ambient temperature, said coil having one end connected to said shaft and the other end connected to one of the arms of said U-shaped hinge assembly, a gear on said shaft, a pinion for rotating said gear, a selector shaft carrying said pinion, and a selector dial on said selector shaft, said shaft, bi-metal coil, gear and pinion located between the arms of said U-shaped hinge assembly.

4. A dual range thermostat as claimed in claim 3, including adjustable means connecting the arms of said U-shaped hinge assembly for changing the differential between the ranges of operation of said switches.

References Cited by the Examiner

UNITED STATES PATENTS

| 2,244,349 | 6/1941 | Rickmeyer | 200—139 |
| 2,299,580 | 10/1942 | Kronmiller | 200—139 X |
| 2,596,657 | 3/1952 | Crum | 200—139 |
| 3,087,032 | 4/1963 | Fleury | 200—139 X |

BERNARD A. GILHEANY, *Primary Examiner.*

T. D. MACBLAIN, H. A. LEWITTER, *Examiners.*